United States Patent
Liu

(10) Patent No.: US 11,240,781 B2
(45) Date of Patent: Feb. 1, 2022

(54) COMMUNICATION METHOD, TERMINAL APPARATUS, AND ACCESS NETWORK APPARATUS

(71) Applicant: Guangdong OPPO Mobile Telecommunications Corp., Ltd., Guangdong (CN)

(72) Inventor: Jianhua Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/496,254

(22) PCT Filed: Mar. 31, 2017

(86) PCT No.: PCT/CN2017/078968
§ 371 (c)(1),
(2) Date: Sep. 20, 2019

(87) PCT Pub. No.: WO2018/176372
PCT Pub. Date: Oct. 4, 2018

(65) Prior Publication Data
US 2020/0053694 A1    Feb. 13, 2020

(51) Int. Cl.
*H04W 68/02* (2009.01)
*H04W 76/11* (2018.01)
(Continued)

(52) U.S. Cl.
CPC .............. *H04W 68/02* (2013.01); *H04W 8/26* (2013.01); *H04W 68/005* (2013.01); *H04W 76/11* (2018.02); *H04W 80/02* (2013.01)

(58) Field of Classification Search
CPC . H04W 68/02; H04W 68/08; H04W 72/0446; H04W 72/1263; H04L 5/001; H04L 5/0092
See application file for complete search history.

(56) References Cited

U.S. PATENT DOCUMENTS

| 6,636,514 B1 | 10/2003 | Caves |
| 2010/0255859 A1 | 10/2010 | Park et al. |

(Continued)

FOREIGN PATENT DOCUMENTS

| CN | 1209027 A | 2/1999 |
| CN | 101048000 A | 10/2007 |

(Continued)

OTHER PUBLICATIONS

European Examination Report dated Aug. 6, 2020 for Application No. 17 904 278.3-1212.

(Continued)

*Primary Examiner* — Iqbal Zaidi
(74) *Attorney, Agent, or Firm* — Young Basile Hanlon & MacFarlane, P.C.

(57) ABSTRACT

A communication method, a terminal device, and an access network device are provided. The method includes: the terminal device receives a first message sent by an access network device; and the terminal device determines a paging type according to the first message. The terminal device includes an input interface and a processor, wherein the input interface is used for receiving a first message sent by an access network device; and the processor is used for determining a paging type according to the first message.

16 Claims, 4 Drawing Sheets

(51) Int. Cl.
*H04W 8/26* (2009.01)
*H04W 68/00* (2009.01)
*H04W 80/02* (2009.01)

(56) References Cited

U.S. PATENT DOCUMENTS

| | | | |
|---|---|---|---|
| 2011/0070900 | A1 | 3/2011 | Shi et al. |
| 2014/0221023 | A1 | 8/2014 | Maggenti et al. |
| 2015/0365914 | A1 | 12/2015 | Yu et al. |
| 2016/0135141 | A1 | 5/2016 | Burbidge et al. |
| 2016/0270028 | A1 | 9/2016 | Lee et al. |
| 2019/0313364 | A1* | 10/2019 | Liang .................. H04W 76/25 |
| 2020/0092845 | A1* | 3/2020 | Cai .................. H04W 68/02 |

FOREIGN PATENT DOCUMENTS

| | | |
|---|---|---|
| CN | 101820616 A | 9/2010 |
| CN | 102202394 A | 9/2011 |
| CN | 105519149 A | 4/2016 |
| CN | 105898894 A | 8/2016 |
| CN | 106171021 A | 11/2016 |
| CN | 108024221 A | 5/2018 |
| EP | 3454623 A1 | 3/2019 |
| EP | 3537789 A1 | 9/2019 |
| EP | 3554183 A1 | 10/2019 |
| RU | 2237974 C2 | 10/2004 |
| RU | 2392769 C2 | 6/2010 |
| WO | 2009035282 A2 | 3/2009 |

OTHER PUBLICATIONS

3GPP TSG-RAN WG2 Meeting #96; R2-167708; Reno, USA, Nov. 14-18, 2016.
3GPP TSG-RAN WG2 Meeting #96; Tdoc R2-168712; Reno, USA, Nov. 14-18, 2016.
English Translation First Russian Office Action dated Jun. 25, 2020 for Application No. 2019133558.
Canada First Office Action for CA Application 3,057,868 dated Nov. 13, 2020.
Korea First Office Action with English Translation for KR Application 10-2019-7027688 dated Nov. 25, 2020.
China First Office Action with English Translation for CN Application 201911330820.6 dated Nov. 2, 2020.
Chili First Office Action with English Translation for CL Application 2019-002722 dated Nov. 19, 2020.
Singapore First Office Action for SG Application 11201908840Q dated Nov. 17, 2020.
Russia Decision to Grant with English Translation for RU Application 2019133558107(066209) dated Oct. 2, 2020.
3GPP TSG-RAN WG2 #97bis Tdoc R2-1702815; Further considerations on RAN and CN paging in INACTIVE; Spokane, U.S., Apr. 3-7, 2017.
European Search Report for European Application No. 17904278.3 dated Jan. 9, 2020.
3GPP TSG-RAN WG2 Meeting #94; R2-163932 Nanjing, China, May 23-27, 2016.
3GPP TSG-RAN WG2 Meeting #95bis; R2-166244 Kaohsiung, Taiwan, Oct. 10-14, 2016.
3GPP TSG-RAN WG2 Meeting #95; R2-165250 Gothenburg, Sweden, Aug. 22-26, 2016.
Japanese Office Action with English Translation for JP Application 2019-551569 dated Mar. 16, 2021. (6 pages).
India Examination Report for IN Application 201917038502 dated Feb. 19, 2021. (6 pages).
European Result of consultation for EP Application 179042783 dated Feb. 16, 2021. (7 pages).
Huawei, HiSilicon, On RAN initiated Paging, 3GPP TSG-RAN WG2 Meeting #97bis, R2-1703459, Apr. 3-7, 2017. (4 pages).
Catt, Handling of data and signalling, 3GPP TSG RAN WG3 Meeting #95bis, R3-170986, Apr. 3-7, 2017. (6 pages).
Taiwan First Office Action with English Translation for TW application 11020768440 dated Aug. 12, 2021.
3GPP TS 36.300 V14.1.0, Evolved Universal Terrestrial Radio Access (E-UTRA) and Evolved Universal Terrestrial Radio Access Network, (Dec. 2016), 4 pages.
Japanese Office Action with English Translation for JP Application 2019551569 dated Aug. 31, 2021. (9 pages).
Extended European Search Report for EP Application 21188003.4 dated Oct. 18, 2021. (17 pages).

* cited by examiner

COMMUNICATION METHOD, TERMINAL APPARATUS, AND ACCESS NETWORK APPARATUS

CROSS-REFERENCE TO RELATED APPLICATION(S)

This application is a 371 application of International Application No. PCT/CN2017/078968, filed on Mar. 31, 2017, the entire disclosure of which is hereby incorporated by reference.

TECHNICAL FIELD

The present disclosure relates to the field of communication, and more particularly to a communication method, a terminal device, and an access network device.

BACKGROUND

In a 5G system, a Radio Access Network (RAN) paging mechanism is introduced. In this mechanism, a connection between a terminal device and a core network is maintained. When downlink data arrives, the core network sends the data to an access network. The core network pages the terminal through the access network. Specifically, paging the terminal by the core network through the access network may include RAN paging and Core Network (CN) paging. For different paging types, subsequent behaviors of the terminal device are different. For example, for the RAN paging, the terminal device needs to transit from an inactive state to an active state to receive downlink data. For the CN paging, the terminal needs to reply to the core network with a corresponding response message.

SUMMARY

Implementations of the present disclosure provide a communication method, a terminal device, and an access network device.

In a first aspect, there is provided a communication method including: receiving, by a terminal device, a first message sent by an access network device; and determining, by the terminal device, a paging type according to the first message.

Optionally, the terminal device may determine the paging type according to specific contents included in the first message, or may determine the paging type according to a resource used to receive the first message.

In combination with the first aspect, in some implementations of the first aspect, the first message is a paging message or a media access control (MAC) layer message.

In combination with the first aspect, in some implementations of the first aspect, the paging type is access network paging or core network paging.

In combination with the first aspect, in some implementations of the first aspect, determining, by the terminal device, the paging type according to the first message, includes: determining, by the terminal device, the paging type according to information of the terminal device included in the first message.

In combination with the first aspect, in some implementations of the first aspect, determining, by the terminal device, the paging type according to the information of the terminal device included in the first message, includes: determining, by the terminal device, that the paging type is core network paging if the information of the terminal device included in the first message is identification information that can uniquely identify the terminal device in a core network; or determining, by the terminal device, that the paging type is access network paging if the information of the terminal device included in the first message is identification information that can uniquely identify the terminal device in an access network.

In combination with the first aspect, in some implementations of the first aspect, the identification information that can uniquely identify the terminal device in the core network is a system architecture evolution temporary mobile station identifier (S-TMSI) or an international mobile subscriber identity (IMSI) of the terminal device.

In combination with the first aspect, in some implementations of the first aspect, the information of the terminal device is a physical layer identifier, and the determining, by the terminal device, the paging type according to the information of the terminal device included in the first message, includes: determining the paging type according to the physical layer identifier included in the first message.

In combination with the first aspect, in some implementations of the first aspect, the determining the paging type according to the physical layer identifier included in the first message includes: determining the paging type to be core network paging if the physical layer identifier is a radio network temporary identifier (RNTI) for core network paging and the terminal device correctly receives the first message according to the physical layer identifier; or determining the paging type to be access network paging if the physical layer identifier is a RNTI for access network paging and the terminal device correctly receives the first message according to the physical layer identifier.

In combination with the first aspect, in some implementations of the first aspect, the information of the terminal device is configured for the terminal device by the access network device or a core network device, or the information of the terminal device is configured according to a protocol.

In combination with the first aspect, in some implementations of the first aspect, the determining, by the terminal device, the paging type according to the first message, includes: determining, by the terminal device, the paging type according to a resource used for receiving the first message.

In combination with the first aspect, in some implementations of the first aspect, the determining, by the terminal device, the paging type according to the resource used for receiving the first message, includes: determining, by the terminal device, that the paging type is core network paging if the terminal device receives the first message on a specific resource for core network paging; or determining, by the terminal device, that the paging type is access network paging if the terminal device receives the first message on a specific resource for access network paging.

In combination with the first aspect, in some implementations of the first aspect, the information of the specific resource for the core network paging or the access network paging includes at least one piece of the following: information of a time domain resource, information of a frequency domain resource, information of a space resource, and information of a code domain resource.

In combination with the first aspect, in some implementations of the first aspect, the information of the specific resource for the core network paging or the access network paging is configured for the terminal device through the access network device or the core network device, or is configured according to a protocol.

In combination with the first aspect, in some implementations of the first aspect, the method further includes: transiting, by the terminal device, from an inactive state to an active state to receive downlink data sent by the access network device if the paging type is access network paging; or replying, by the terminal device, a corresponding response message to the core network device if the paging type is core network paging.

In a second aspect, there is provided a communication method including: receiving, by an access network device, data of a terminal device transmitted by a core network device; and determining a paging type for the terminal device according to the data of the terminal device.

In combination with the second aspect, in some implementations of the second aspect, the paging type is access network paging or core network paging.

In combination with the second aspect, in some implementations of the second aspect, the determining the paging type for the terminal device according to the data of the terminal device includes: determining, by the access network device, that the paging type is access network paging if the data of the terminal device is user plane data of the terminal device; or determining, by the access network device, that the paging type is core network paging if the data of the terminal device is a control plane signaling of the terminal device; or determining, by the access network device, that the paging type is core network paging if the data of the terminal device includes a paging request.

In combination with the second aspect, in some implementations of the second aspect, the method further includes generating a first message including information of the terminal device according to the paging type; and sending the first message to the terminal device.

In combination with the second aspect, in some implementations of the second aspect, the generating the first message including the information of the terminal device according to the paging type includes: the information of the terminal device included in the first message being identification information that can uniquely identify the terminal device in a core network if the access network device determines that the paging type is core network paging; or the information of the terminal device included in the first message being identification information that can uniquely identify the terminal device in an access network if the access network device determines that the paging type is access network paging.

In combination with the second aspect, in some implementations of the second aspect, the identification information that can uniquely identify the terminal device in the core network is a system architecture evolution temporary mobile station identifier (S-TMSI) or an international mobile subscriber identity (IMSI) of the terminal device.

In combination with the second aspect, in some implementations of the second aspect, the generating the first message including the information of the terminal device according to the paging type includes: the information of the terminal device included in the first message being a radio network temporary identifier (RNTI) for the core network paging if the access network device determines that the paging type is core network paging; or the information of the terminal device included in the first message being a RNTI for access network paging if the access network device determines that the paging type is access network paging.

In combination with the second aspect, in some implementations of the second aspect, the information of the terminal device is configured for the terminal device by the access network device or the core network device, or the information of the terminal device is configured according to a protocol.

In combination with the second aspect, in some implementations of the second aspect, the method further includes: using, by the access network device, a specific resource to send a first message to the terminal device according to the paging type.

In combination with the second aspect, in some implementations of the second aspect, the sending, by the access network device, the first message to the terminal device using the specific resource according to the paging type, includes: sending the first message to the terminal device on a specific resource for core network paging if the access network device determines that the paging type is core network paging; or sending the first message to the terminal device on a specific resource for access network paging if the access network device determines that the paging type is access network paging.

In combination with the second aspect, in some implementations of the second aspect, the information of the specific resources for the core network paging or the access network paging includes at least one piece of the following: information of a time domain resource, information of a frequency domain resource, information of a space resource, and information of a code domain resource.

In combination with the second aspect, in some implementations of the second aspect, the information of the specific resource for the core network paging or the access network paging is configured for the terminal device through the access network device or the core network device, or is configured according to a protocol.

In combination with the second aspect, in some implementations of the second aspect, the first message is a paging message or a media access control (MAC) layer message.

In a third aspect, there is provided a terminal device including units for implementing the method in the first aspect or various implementations thereof.

In a fourth aspect, there is provided an access network device including units for implementing the method in the second aspect or various implementations thereof.

In a fifth aspect, there is provided a terminal device including a memory for storing programs, a transceiver, and a processor for executing the programs, and when executing the programs, the processor executes the method in the first aspect based on the transceiver.

In a sixth aspect, there is provided an access network device including a memory for storing programs, a transceiver, and a processor for executing the programs, and when executing the programs, the processor executes the method in the second aspect based on the transceiver.

In a seventh aspect, there is provided a computer readable medium storing program codes for execution by a terminal device, wherein the program codes includes instructions for executing the method in the first aspect.

In an eighth aspect, there is provided a computer readable medium storing program codes for execution by an access network device, wherein the program codes include instructions for executing the method in the second aspect.

DETAILED DESCRIPTION

Figure 1:
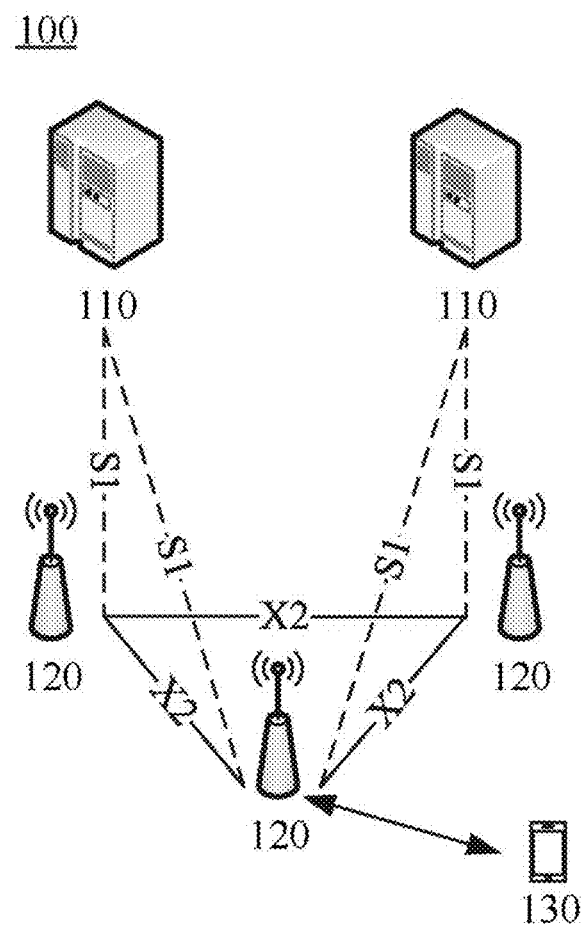
FIG. 1 is a schematic diagram of a wireless communication system according to an implementation of the present disclosure.

Hereinafter, technical solutions in the implementations of the present disclosure will be described with reference to the accompanying drawings.

It should be understood that technical solutions of the present disclosure may be applied to various communication systems, such as a Global System of Mobile Communication (GSM), a Code Division Multiple Access (CDMA) system, a Wideband Code Division Multiple Access (WCDMA) system, General Packet Radio Service (GPRS), a Long Term Evolution (LTE) system, an Advanced Long Term Evolution (LTE-A) system, a Universal Mobile Telecommunication System (UMTS), a next generation communication system and the like.

In the implementation of the present disclosure, an access network may be a Radio Access Network (RAN), specifically, a base station. The base station may be a Base Transceiver Station (BTS) in a global system for mobile communication (GSM) system or a Code Division Multiple Access (CDMA) system. Or it may be a base station (NodeB) in a Wideband Code Division Multiple Access (WCDMA) system, or an evolution Node B (eNB or eNodeB) in an LTE system, or a Transmission Reception Point (TRP), a base station device, a small base station device, or the like in a future 5th Generation (5G) network, which is not particularly limited in the present disclosure.

A terminal device may communicate with a core network through a RAN, and the terminal device may be referred to as an access terminal, a user equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device with a wireless communication function, a computing device or other processing device connected to a wireless modem, an on-board device, a wearable device and a terminal device in a next generation communication system such as a future 5G network, or a terminal device in a future evolving public land mobile network (PLMN), etc.

In addition, various aspects or features of the present disclosure may be implemented as methods, apparatuses, or articles of manufacture using standard programming and/or engineering techniques. The term "article of manufacture" used in the present disclosure encompasses a computer program accessible from any computer-readable device, carrier, or medium. For example, the computer-readable medium may include, but not limited to, a magnetic storage device (such as a hard disk, a floppy disk, or a magnetic tape), a disk (such as a compact disc (CD), a digital versatile disc (DVD)), a smart card and a flash storage device (such as Erasable Programmable Read-Only Memory (EPROM), a card, a stick or a key driver). In addition, various storage mediums described herein may represent one or more devices and/or other machine-readable mediums for storing information. The term "machine-readable medium" may include, but not limited to, a radio channel and various other mediums capable of storing, containing, and/or carrying instructions and/or data.

FIG. 1 is a schematic diagram of a communication system 100 applicable to an implementation of the present disclosure. As shown in FIG. 1, the communication system 100 includes: at least one core network device 110, at least one access network device 120, and at least one terminal device 130. The core network device 110 may include a Mobility Management Entity (MME), a Serving Gateway (S-GW), etc. The access network device may be a base station. The core network is communicatively connected with the base station through an S1 interface. Specifically, the MME may be connected with the base station through an S1-MME interface, and the S-GW may be connected with the base station through an S1-U interface. The base station may communicate and connect with another base station through an X2 interface. The terminal device may be communicatively connected with the base station through a wireless communication interface.

It should be understood that the core network device, the access network device, and the terminal device shown in FIG. 1 are merely example identifiers, and the communication system may include more core network devices, access network devices, or terminal devices. A quantity of core network devices, access network devices, or terminal devices is not particularly limited in the present disclosure.

In the communication system shown in FIG. 1, the terminal device may access a network by establishing an RRC connection with the access network device. The terminal device that has established the RRC connection is in a connected state, or may be called an activated state. The terminal device that has released the RRC connection is in an idle state, or may be called an inactive state. The terminal device in the connected state may send and receive data with the access network device, and there is no signaling connection between the terminal device in the idle state and the access network device.

In a 5G system, a RAN paging mechanism is introduced, in which a terminal device and a core network device remain in connection, and when downlink data of the terminal device arrives, the core network device sends downlink data of the terminal device to the access network device, and the access network device sends the downlink data to the terminal device, and the terminal device needs to transit from an inactive state to an active state to receive the downlink data. However, in some scenarios, the core network will still initiate a paging process to the terminal device, for example, when the core network needs to initiate CS FallBack, or when paging through the access network fails. For the terminal device, subsequent behaviors for received RAN paging and for received CN paging are different. Therefore, an implementation of the present disclosure provides a communication method, in which the terminal device can determine a paging type of a message.

Figure 2:
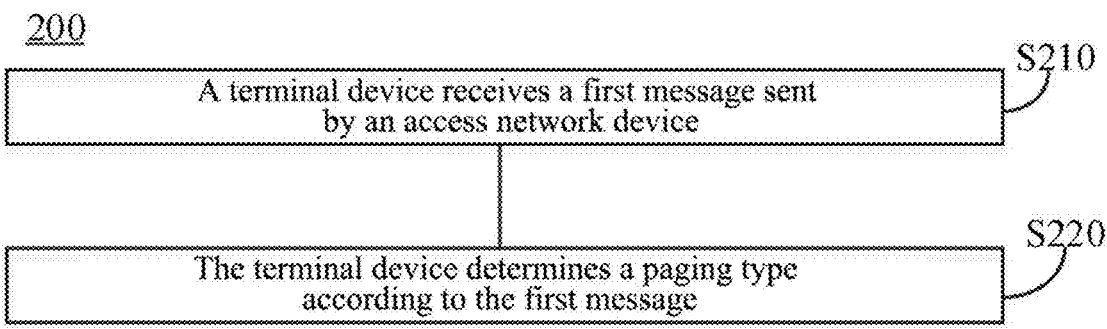
FIG. 2 is a schematic flowchart of a communication method according to an implementation of the present disclosure.

FIG. 2 is a schematic flowchart of a communication method 200 according to an implementation of the present disclosure, which may be executed by the terminal device in the wireless communication system shown in FIG. 1. As shown in FIG. 2, the method 200 includes acts S210 and S220.

In S210, a terminal device receives a first message sent by an access network device.

Specifically, the first message may be a paging message, such as a Radio Resource Control (RRC) message which may be an RRC Connection Request message, or an RRC Connection Setup Complete message, or an RRC Connection Reconfiguration message, or an RRC Connection Release message.

Optionally, the first message may be a media access control (MAC) message.

In S220, the terminal device determines a paging type according to the first message.

Specifically, the terminal device may determine the paging type according to contents carried in the first message, or may determine the paging type according to resources used to receive the first message, and the paging type is access network paging or core network paging.

Optionally, in some implementations, the method 200 further includes: if the paging type is access network paging, the terminal device transits from an inactive state to an active state to receive downlink data sent by the access network device; or if the paging type is core network paging, the terminal device replies a corresponding response message to the core network device.

In other words, for different paging types, the subsequent behaviors of the terminal device are different. When the paging type is core network paging, the first message sent by the access network device may be considered as a forwarding message of the paging message sent by the core network device. In this case, the terminal device needs to reply to the core network device with a corresponding response message. The acts performed by the core network device after receiving the response message are similar to those in the related art, and will not be described here for brevity.

Or, if the paging type is determined to be access network paging, it indicates that the terminal device and the access network device are still in a connected state, so the terminal device may transit from an inactive state to an active state to receive downlink data sent by the access network device.

Optionally, in some implementations, the act S220 may specifically include: the terminal device determines the paging type according to information of the terminal device included in the first message.

Specifically, the information of the terminal device may be identification information of the terminal device. For example, the identification information of the terminal device may be identification information that can uniquely identify the terminal device in a core network or an access network, or the information of the terminal device may be a physical layer identifier, for example, the physical layer identifier may be a radio network temporary identifier (RNTI), and the first message may include the RNTI or be scrambled by the RNTI.

Optionally, in some implementations, the terminal device determines the paging type according to the information of the terminal device included in the first message, including: if the information of the terminal device included in the first message is identification information that can uniquely identify the terminal device in the core network, the terminal device determines that the paging type is core network paging; or if the information of the terminal device included in the first message is identification information that can uniquely identify the terminal device in the access network, the terminal device determines that the paging type is access network paging.

For example, the identification information that can uniquely identify the terminal device in the core network may be a System Architecture Evolution (SAE) Temporary Mobile Station Identifier (S-TMSI) or an international mobile subscriber Identity (IMSI).

The first message may be a paging message or a MAC message. For example, the S-TMSI or IMSI of the terminal device may be included in the paging message or a MAC Protocol Data Unit (PDU), and the terminal device may determine the S-TMSI or IMSI in the paging message or MAC PDU, and determine the paging type as core network paging. Similarly, if the identification information of the terminal device included in the paging message or MAC PDU is the identification information of the terminal device in the access network, the terminal device may determine that the paging type is access network paging.

It should be understood that the specific contents of the information of the terminal device illustrated herein are merely exemplary and should not constitute any limitation to the present disclosure. The identification information of the terminal device in the core network may be S-TMSI, IMSI, or even another identification used to uniquely identify the terminal device in the core network, so is the identification information of the terminal device in the access network, and the implementation of the present disclosure is not limited thereto.

Optionally, in some implementations, the information of the terminal device is a physical layer identifier, and the terminal device determines the paging type according to the information of the terminal device included in the first message, including: determining the paging type according to the physical layer identifier included in the first message.

For example, the physical layer identifier may be an RNTI for access network paging, or may be an RNTI for core network paging. The physical layer identifier may be included in the first message, or the first message may be scrambled by the physical layer identifier. If the terminal device correctly receives the first message at a specific moment according to the physical layer identifier, the paging type may be determined according to the physical layer identifier. For example, if the physical layer identifier is a RNTI for core network paging and the terminal device correctly receives the first message at a specific moment according to the RNTI for core network paging, the paging type may be determined as core network paging. Similarly, if the physical layer identifier is a RNTI for access network paging, and the terminal device correctly receives the first message according to the RNTI for access network paging, the paging type may be determined as access network paging.

Optionally, in the implementation of the present disclosure, the information of the terminal device may be configured for the terminal device by an access network device or a core network device, or the information of the terminal device may be agreed upon by a protocol.

Specifically, the information of the terminal device may be configured for the terminal device by the network device through a semi-static configuration. For example, the access network device or the core network device may configure the information of the terminal device to the terminal device by a high-level signaling (for example, an RRC signaling).

Or, the information of the terminal device may be configured for the terminal device by a network device through a dynamic configuration. For example, the access network device may configure the information of the terminal device to the terminal device through a Physical Downlink Control Channel (PDCCH).

Or, the information of the terminal device may be agreed upon by a protocol, for example, the protocol may agree upon information of the terminal device used for access network paging and information of the terminal device used for core network paging. Both the access network device and the terminal device may acquire information of the terminal device corresponding to different paging types according to the protocol. Therefore, it is not necessary for the network device to configure the information of the terminal device to the terminal device. The access network device may include the information of the terminal device in the first message according to the paging type and the information of the terminal device agreed upon by the protocol for the paging type, and send the first message to the terminal device. After receiving the first message, the terminal device may acquire the information of the terminal device from the first message, and then it may determine a corresponding paging type according to the information of the terminal device agreed upon by the protocol.

It should be understood that the first message listed above for carrying the information of the terminal device are merely exemplary and should not constitute any limitation to the present disclosure. The information of the terminal device may be carried in an existing message specified in an existing protocol (e.g., the specific message listed above or another existing message), that is, an indication field for indicating the information of the terminal device may be added to the existing message, or the information of the terminal device may be carried in a newly added message, that is, the newly added message in the existing protocol are used to carry the information of the terminal device, which is not particularly limited in the present disclosure. Using an existing message specified in an existing protocol to carry the information of the terminal device is a relatively easy method to be implemented and may reduce signaling overhead.

Optionally, in some implementations, the terminal device determines the paging type according to the first message, including: the terminal device determines the paging type according to a resource used for receiving the first message.

Further, the terminal device determines the paging type according to the resource used for receiving the first message, including: if the terminal device receives the first message on a specific resource for core network paging, the terminal device determines that the paging type is core network paging; or if the terminal device receives the first message on a specific resource for access network paging, the terminal device determines that the paging type is access network paging.

Specifically, resources for access network paging and resources for core network paging may be predetermined, i.e., the access network paging and core network paging use different resources. Information of resources for the core network paging or the access network paging includes at least one piece of: information of a time domain resource, information of a frequency domain resource, information of a space resource, and information of a code domain resource.

Therefore, the terminal device may determine the paging type according to the resource used to receive the first message. For example, if the first message is received on a specific resource (e.g., a specific time domain resource, or frequency domain resource, or time frequency resource, or code domain resource, etc.) used for access network paging, the terminal device may determine the paging type as access network paging. Or, if the first message is received on a specific resource (e.g., a specific time domain resource, or frequency domain resource, or time frequency resource, or code domain resource, etc.) for core network paging, the terminal device may determine the paging type as core network paging.

It should be noted that, in the implementation of the present disclosure, the information of the specific resource for the core network paging or the access network paging is configured for the terminal device through the access network device or the core network device, or is configured according to a protocol.

Specifically, the information of the specific resource for core network paging or access network paging may be configured for the terminal device by a network device through a semi-static configuration. For example, the access network device or core network device may configure the information of the specific resource for core network paging or access network paging to the terminal device through a high-level signaling (e.g., an RRC signaling).

Or, the information of the specific resource for core network paging or access network paging may be configured for the terminal device by network device through a dynamic configuration. For example, the access network device may configure the information of the specific resource for core network paging or access network paging to the terminal device through a Physical Downlink Control Channel (PDCCH).

Or, the information of the specific resource for core network paging or access network paging may be agreed upon by the protocol. For example, the protocol may agree on information of a resource for access network paging and information of a resource for core network paging. Both the access network device and the terminal device may acquire information of resources corresponding to different paging types according to the protocol. Therefore, it is not necessary for the network device to configure the information of the specific resource for the core network paging or the access network paging to the terminal device. The access network device may determine information of a resource corresponding to a paging type according to the paging type in combination with a protocol agreement, so that the access network device may use the resource to send the first message to the terminal device. After receiving the first message, the terminal device may determine a corresponding paging type according to a resource used to receive the first message.

The method for uplink transmission according to the implementation of the present disclosure is described in detail from a perspective of a terminal device above in combination with FIG. 2. A method for uplink transmission according to another implementation of the present disclosure is described in detail from a perspective of an access network device below in combination with FIG. 3. It should be understood that the description of the access network device side corresponds to the description of the terminal device side, and the above may be referred to for similar descriptions, which will not be repeated here to avoid repetition.

Figure 3:
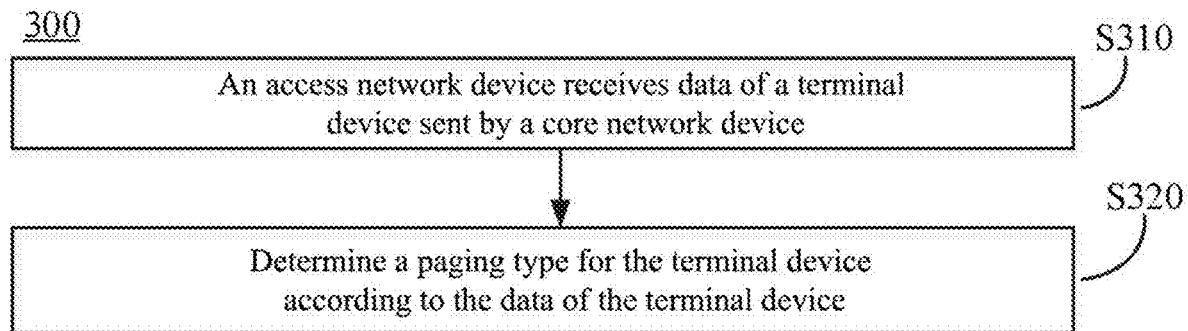
FIG. 3 is a schematic flowchart of a communication method according to another implementation of the present disclosure.

FIG. 3 is a schematic flowchart of a communication method according to another implementation of the present disclosure. As shown in FIG. 3, the communication method 300 may include acts S310 and S320.

In S310, an access network device receives data of a terminal device sent by a core network device.

In S320, a paging type for the terminal device is determined according to the data of the terminal device.

Specifically, the data of the terminal device may be downlink data of a user plane or a signaling of a control plane, and the access network device may determine the paging type of the terminal device according to specific contents of the data of the terminal device sent by the core network device, wherein the paging type is access network paging or core network paging.

Optionally, determining the paging type for the terminal device according to the data of the terminal device specifically includes: if the data of the terminal device is data of a user plane of the terminal device, the access network device determines that the paging type is access network paging; or if the data of the terminal device is a signaling of a control plane of the terminal device, the access network device determines that the paging type is core network paging; or if the data of the terminal device includes a paging request, the access network device determines that the paging type is core network paging.

Optionally, in some implementations, the method further includes: generating a first message including information of the terminal device according to the paging type; and sending the first message to the terminal device.

Specifically, after the access network device determines the paging type, further, the access network device may generate a first message according to the paging type, and the first message may be used for the terminal device to determine the paging type according to the first message. The access network device may include information of the terminal device in the first message to facilitate the terminal device to determine the paging type according to the information of the terminal device in the received first message. Or the access network device may send the first message using a specific resource, so that the terminal device may determine the paging type according to a resource used to receive the first message.

Optionally, in some implementations, generating the first message including the information of the terminal device according to the paging type includes: if the access network device determines that the paging type is core network paging, the information of the terminal device included in the first message is identification information that can uniquely identify the terminal device in the core network; or if the access network device determines that the paging type is access network paging, the information of the terminal device included in the first message is identification information that can uniquely identify the terminal device in the access network.

Specifically, when the access network device determines that the paging type is core network paging, the identification information of the terminal device in the core network may be included in the first message, so that the terminal device may determine that the paging type is core network paging according to the identification information of the terminal device in the core network included in the first message. Similarly, if the access network device determines that the paging type is access network paging, the identification information of the terminal device in the access network may be included in the first message, so that the terminal device may determine that the paging type is access network paging according to the identification information of the terminal device in the access network in the first message.

Optionally, the identification information that can uniquely identify the terminal device in the core network is a system architecture evolution temporary mobile station identifier (S-TMSI) or an international mobile subscriber identity (IMSI) of the terminal device.

Optionally, in some implementations, the generating the first message including the information of the terminal device according to the paging type includes: if the access network device determines that the paging type is core network paging, the information of the terminal device included in the first message is a radio network temporary identifier (RNTI) for core network paging; or if the access network device determines that the paging type is access network paging, the information of the terminal device included in the first message is a RNTI for access network paging.

Specifically, if the access network device determines that the paging type is core network paging, the access network device may scramble the first message through the RNTI for core network paging, or include the RNTI for core network paging in the first message. If the terminal device correctly receives the first message according to the RNTI for core network paging, the paging type is determined to be core network paging.

For access network paging, it is similar and will not be repeated here for the sake of brevity.

Optionally, in some implementations, the information of the terminal device is configured for the terminal device by the access network device or the core network device, or the information of the terminal device is configured according to a protocol.

Optionally, in some implementations, the method further includes: the access network device uses a specific resource to send a first message to the terminal device according to the paging type.

Optionally, in some implementations, the access network device uses the specific resource to send the first message to the terminal device according to the paging type, specifically including: if the access network device determines that the paging type is core network paging, the access network device sends the first message to the terminal device on a specific resource for core network paging; or if the access network device determines that the paging type is access network paging, the access network device sends the first message to the terminal device on a specific resource for access network paging.

For example, different resources may be predetermined to be used for access network paging and core network paging, so that the access network device may send the first message using a corresponding resource according to a paging type. For example, if it is determined that the paging type is access network paging, the first message is sent on a specific resource for access network paging, so that if the terminal device receives the first message on the specific resource for access network paging, the paging type may be determined to be access network paging.

Optionally, in some implementations, the information of the specific resource for the core network paging or the access network paging includes at least one piece of the following: information of a time domain resource, information of a frequency domain resource, information of a space resource and information of a code domain resource.

Optionally, in some implementations, the information of the specific resource for core network paging or access network paging is configured for the terminal device through the access network device or the core network device, or is configured according to a protocol.

Optionally, in some implementations, the first message is a paging message or a media access control (MAC) layer message.

Method implementations of the present disclosure are described in detail above with reference to FIGS. 2 to 3, and apparatus implementations of the present disclosure are described in detail below with reference to FIGS. 4 to 7. It should be understood that the apparatus implementations and the method implementations correspond to each other, and the method implementations may be referred to for similar description.

Figure 4:
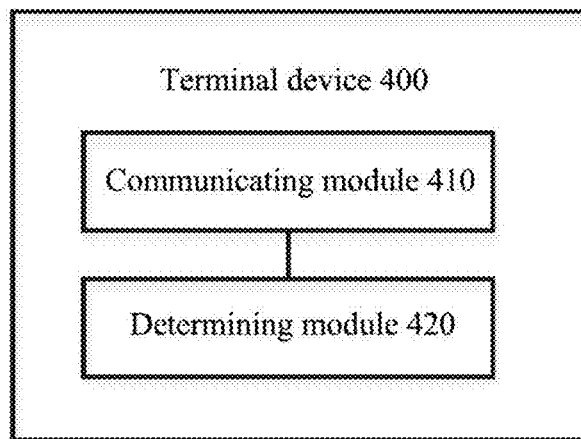
FIG. 4 is a schematic block diagram of a terminal device according to an implementation of the present disclosure.

FIG. 4 is a schematic block diagram of a terminal device according to an implementation of the present disclosure. The terminal device 400 of FIG. 4 includes: a communicating module 410 and a determining module 420.

The communicating module 410 is used for receiving a first message sent by an access network device.

The determining module 420 is used for determining a paging type according to the first message.

Optionally, in some implementations, the first message is a paging message or a media access control (MAC) layer message.

Optionally, in some implementations, the paging type is access network paging or core network paging.

Optionally, in some implementations, the determining module 420 is specifically used for: determining the paging type according to information of the terminal device included in the first message.

Optionally, in some implementations, the determining module 420 is specifically used for: if the information of the terminal device included in the first message is identification information that can uniquely identify the terminal device in a core network, determining the paging type as core network paging; or if the information of the terminal device included in the first message is identification information that can uniquely identify the terminal device in an access network, determining the paging type as access network paging.

Optionally, in some implementations, the identification information that can uniquely identify the terminal device in the core network is a system architecture evolution temporary mobile station identifier (S-TMSI) or an international mobile subscriber identity (IMSI) of the terminal device.

Optionally, in some implementations, the information of the terminal device is a physical layer identifier, and the determining module 420 is specifically used for: determining the paging type according to the physical layer identifier included in the first message.

Optionally, in some implementations, the determining module 420 is specifically used for: if the physical layer identifier is a radio network temporary identifier (RNTI) for core network paging and the terminal device correctly receives the first message according to the physical layer identifier, determining the paging type as core network paging; or if the physical layer identifier is a RNTI for access network paging and the terminal device correctly receives the first message according to the physical layer identifier, determining the paging type as access network paging.

Optionally, in some implementations, the information of the terminal device is configured for the terminal device by the access network device or a core network device, or the information of the terminal device is configured according to a protocol.

Optionally, in some implementations, the determining module 420 is specifically used for: determining the paging type according to a resource used for receiving the first message.

Optionally, in some implementations, the determining module 420 is specifically used for: determining that the paging type is core network paging if the terminal device receives the first message on a specific resource for core network paging; or determining that the paging type is access network paging if the terminal device receives the first message on a specific resource for access network paging.

Optionally, in some implementations, the information of the specific resources for the core network paging or the access network paging includes at least one piece of the following: information of a time domain resource, information of a frequency domain resource, information of a space resource and information of a code domain resource.

Optionally, in some implementations, the information of the specific resource for the core network paging or the access network paging is configured for the terminal device through the access network device or the core network device, or is configured according to a protocol.

Optionally, in some implementations, the communicating module 410 is further used for: transiting from an inactive state to an active state to receive downlink data sent by the access network device if the paging type is access network paging; or replying a corresponding response message to the core network device if the paging type is core network paging.

Specifically, the terminal device 400 may correspond to (e.g., may be configured as or be itself) the terminal device described in the method 200. And various modules or units in the terminal device 400 are respectively used for executing various acts or processes performed by the terminal device in the method 200. Herein, in order to avoid redundancy, detailed description thereof is omitted.

Figure 5:
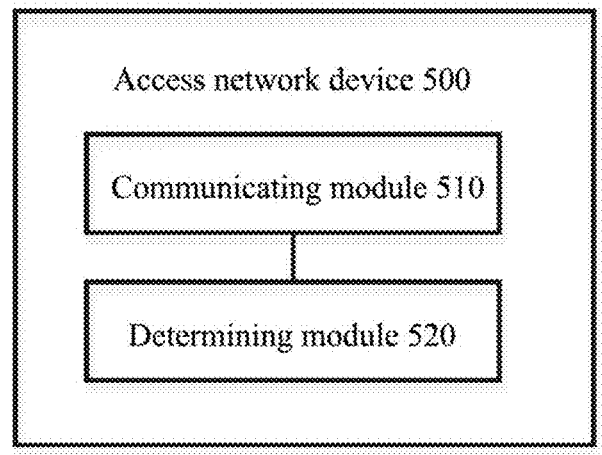
FIG. 5 is a schematic block diagram of an access network device according to an implementation of the present disclosure.

FIG. 5 is a schematic block diagram of an access network device according to an implementation of the present disclosure. The access network device 500 of FIG. 5 includes a communicating module 510 and a determining module 520.

The communicating module 510 is used for receiving data of a terminal device sent by a core network device.

The determining module 520 is used for determining a paging type for the terminal device according to the data of the terminal device.

Optionally, in some implementations, the paging type is access network paging or core network paging.

Optionally, in some implementations, the determining module 520 is specifically used for: determining that the paging type is access network paging if the data of the terminal device is data of a user plane of the terminal device; or determining the paging type as core network paging if the data of the terminal device is a signaling of a control plane of the terminal device; or determining the paging type as core network paging if the data of the terminal device includes a paging request.

Optionally, in some implementations, the access network device 500 further includes: a generating module, used for generating a first message including information of the terminal device according to the paging type.

The communicating module 510 is further used for: sending the first message to the terminal device.

Optionally, in some implementations, if the access network device determines that the paging type is core network paging, the information of the terminal device included in the first message is identification information that can uniquely identify the terminal device in the core network; or if the access network device determines that the paging type is access network paging, the information of the terminal device included in the first message is identification information that can uniquely identify the terminal device in the access network.

Optionally, in some implementations, the identification information capable of uniquely identifying the terminal device in the core network is a system architecture evolution temporary mobile station identifier (S-TMSI) or an international mobile subscriber identity (IMSI) of the terminal device.

Optionally, in some implementations, if the access network device determines that the paging type is core network paging, the information of the terminal device included in the first message is a radio network temporary identifier (RNTI) for core network paging; or if the access network device determines that the paging type is access network paging, the information of the terminal device included in the first message is a RNTI for access network paging.

Optionally, in some implementations, the information of the terminal device is configured for the terminal device by the access network device or the core network device, or the information of the terminal device is configured according to a protocol.

Optionally, in some implementations, the communicating module is further used for: using a specific resource to send the first message to the terminal device according to the paging type.

Optionally, in some implementations, the communicating module is specifically used for: sending the first message to the terminal device on a specific resource for core network paging if the access network device determines that the paging type is core network paging; or sending the first message to the terminal device on a specific resource for access network paging if the access network device determines that the paging type is access network paging.

Optionally, in some implementations, the information of the specific resource for the core network paging or the access network paging includes at least one piece of the following: information of a time domain resource, information of a frequency domain resource, information of a space resource, and information of a code domain resource.

Optionally, in some implementations, the information of the specific resource for the core network paging or the access network paging is configured for the terminal device through the access network device or the core network device, or is configured according to a protocol.

Optionally, in some implementations, the first message is a paging message or a media access control (MAC) layer message.

Specifically, the access network device 500 may correspond to (e.g., may be configured as or be itself) the access network device described in the method 300, and various modules or units in the access network device 500 are respectively used for executing various acts or processes performed by the access network device in the method 300. Herein, in order to avoid redundancy, detailed description thereof is omitted.

Figure 6:
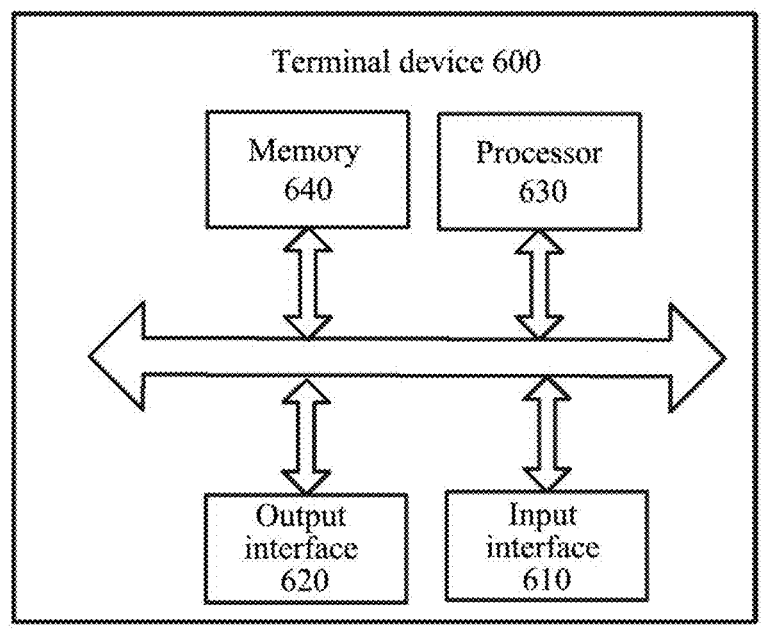
FIG. 6 is a schematic block diagram of a terminal device according to another implementation of the present disclosure.

As shown in FIG. 6, the implementation of the present disclosure provides a terminal device 600, which may be the terminal device 400 in FIG. 4 and can be used for executing the operations of the terminal device corresponding to the method 200 in FIG. 2. The terminal device 600 includes an input interface 610, an output interface 620, a processor 630, and a memory 640. The input interface 610, the output interface 620, the processor 630, and the memory 640 may be connected through a bus system. The memory 640 is used for storing programs, instructions, or codes. The processor 630 is used for executing programs, instructions, or codes in the memory 640 to control the input interface 610 to receive signals, to control the output interface 620 to send signals, and to complete the operations in the method implementations.

It should be understood that in the implementations of the present disclosure, the processor 630 may be a Central Processing Unit (CPU), or the processor 630 may be another general processor, a digital signal processor (DSP), an application specific integrated circuit (ASIC), a field programmable gate arrays (FPGA) or another programmable logic device, a discrete gate, or a transistor logic device, a discrete hardware component, etc. The general processor may be a microprocessor, or the processor may be any conventional processor or the like.

The memory 640 may include a read only memory and a random access memory, and provide instructions and data to the processor 630. A portion of memory 640 may include non-volatile random access memory. For example, the memory 640 may also store type information of a device.

In implementation processes, various acts of the method may be accomplished by an integrated logic circuit of hardware or instructions in a form of software in the processor 630. The acts of the method disclosed in connection with the implementation of the present disclosure may be directly embodied to be accomplished by execution of a hardware processor or by a combination of hardware and software modules in the processor. The software modules may be located in a storage medium commonly used in the art, such as a random access memory, a flash memory, a read-only memory, a programmable read-only memory, or an electrically erasable programmable memory, or a register. The storage medium is located in the memory 640, and the processor 630 reads information in the memory 640 and completes the acts of the method in combination with its hardware. In order to avoid repetition, it will not be described in detail here.

In a specific implementation, the determining module 420 included in the terminal device in FIG. 4 may be implemented by the processor 630 in FIG. 6, and the communicating module 410 included in the terminal device 400 may be implemented by the input interface 610 and the output interface 620 in FIG. 6.

Figure 7:
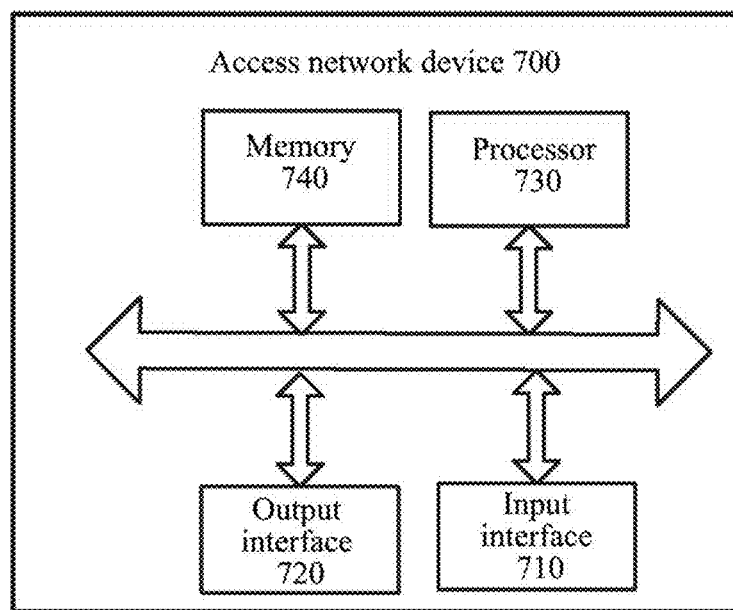
FIG. 7 is a schematic block diagram of an access network device according to another implementation of the present disclosure.

As shown in FIG. 7, the implementation of the present disclosure provides an access network device 700, which may be the access network device 500 in FIG. 5, and can be used for executing the operations of the access network device corresponding to the method 300 in FIG. 3. The network device 700 includes an input interface 710, an output interface 720, a processor 730, and a memory 740. The input interface 710, the output interface 720, the processor 730, and the memory 740 may be connected through a bus system. The memory 740 is used for storing programs, instructions, or codes. The processor 730 is used for executing programs, instructions, or codes in the memory 740 to control the input interface 710 to receive signals, to control the output interface 720 to send signals, and to complete the operations in the method implementations.

It should be understood that in the implementations of the present disclosure, the processor 730 may be a Central Processing Unit (CPU), or the processor 730 may be another general processor, a digital signal processor (DSP), an application specific integrated circuit (ASIC), a field programmable gate arrays (FPGA), or another programmable logic device, a discrete gate, or a transistor logic device, a discrete hardware components, etc. The general processor may be a microprocessor, or the processor may be any conventional processor or the like.

The memory 740 may include a read only memory and a random access memory, and provide instructions and data to the processor 730. A portion of memory 740 may include non-volatile random access memory. For example, the memory 740 may also store type information of a device.

In implementation processes, various acts of the methods may be accomplished by an integrated logic circuit of hardware or instructions in a form of software in the processor 730. The acts of the method disclosed in connection with the implementation of the present disclosure may be directly embodied to be accomplished by execution of a hardware processor or by a combination of hardware and software modules in the processor. The software modules may be located in a storage medium commonly used in the art, such as a random access memory, a flash memory, a read-only memory, a programmable read-only memory, or an electrically erasable programmable memory, or a register. The storage medium is located in the memory 740, and the processor 730 reads information in the memory 740 and completes the acts of the method in combination with its hardware. In order to avoid repetition, it will not be described in detail here.

In a specific implementation, the determining module 520 and the generating module included in the access network device in FIG. 5 may be implemented by the processor 730 in FIG. 7, and the communicating module 510 included in the access network device 500 may be implemented by the input interface 710 and the output interface 720 in FIG. 7.

Those of ordinary skill in the art may recognize that various example units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present disclosure.

Those skilled in the art may clearly understand that for convenience and conciseness of description, the specific working process of the systems, apparatuses and units described above may refer to the corresponding processes in the implementations of methods, and details are not described herein again.

In several implementations provided by the present disclosure, it should be understood that the disclosed systems, apparatuses and methods may be implemented in other ways. For example, the apparatus implementations described above are only illustrative, for another example, the division of the units is only a logical function division, and there may be other division manners in actual realization. For still another example, multiple units or components may be combined or integrated into another system, or some features may be ignored or not executed. On the other hand, the mutual coupling or direct coupling or communication connection shown or discussed may be indirect coupling or communication connection through some interfaces, apparatuses, or units, and may be in electrical, mechanical or other forms.

The units described as separated components may or may not be physically separated, and the component shown as a unit may or may not be a physical unit, i.e., it may be located in one place, or may be allocated over multiple network units. Some or all of the units may be selected according to practical needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on this understanding, the technical solution of the present disclosure, in essence, or the part contributing to the related art, or the part of the technical solution, may be embodied in the form of a software product stored in a storage medium, including a number of instructions for causing a computer device (which may be a personal computer, a server, or a network device) to perform all or part of the acts of the method described in various implementations of the present disclosure. The storage medium include a U disk, a mobile hard disk, a read-only memory (ROM), a random access memory (RAM), a magnetic disk, or an optical disk, and other medium capable of storing program codes.

The foregoing are merely example implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be subject to the protection scope of the claims.

What is claimed is:

1. A method of communication, comprising:
receiving, by a terminal device, a first message sent by an access network device; and
determining, by the terminal device, a paging type according to information of the terminal device comprised in the first message, comprising at least one of:
determining, by the terminal device, that the paging type is core network paging when the information of the terminal device comprised in the first message is identification information that is able to uniquely identify the terminal device in a core network;
determining, by the terminal device, that the paging type is access network paging when the information of the terminal device comprised in the first message is identification information that is able to uniquely identify the terminal device in an access network; or
determining, by the terminal device, that the paging type is access network paging when the information of the terminal device is a physical layer identifier and the physical layer identifier is a radio network temporary identifier (RNTI) for access network paging.

2. The method according to claim 1, wherein the first message is a paging message or a media access control (MAC) layer message.

3. The method according to claim 1, wherein the paging type is access network paging or core network paging.

4. The method according to claim 1, wherein the identification information that is able to uniquely identify the terminal device in the core network is a system architecture evolution temporary mobile station identifier (S-TMSI) or an international mobile subscriber identity (IMSI) of the terminal device.

5. The method according to claim 1, wherein the information of the terminal device is configured for the terminal device by the access network device or a core network device, or the information of the terminal device is configured according to a protocol.

6. A terminal device, comprising an input interface and a processor, wherein
the input interface is used for receiving a first message sent by an access network device; and
the processor is used for determining a paging type according to information of the terminal device comprised in the first message, comprising at least one of:
determining the paging type as core network paging when the information of the terminal device comprised in the first message is identification information that is able to uniquely identify the terminal device in a core network;
determining the paging type as access network paging when the information of the terminal device comprised in the first message is identification information that is able to uniquely identify the terminal device in an access network; or
determining that the paging type is access network paging when the information of the terminal device is a physical layer identifier and the physical layer identifier is a radio network temporary identifier (RNTI) for access network paging.

7. The terminal device according to claim 6, wherein the first message is a paging message or a media access control (MAC) layer message.

8. The terminal device according to claim 6, wherein the paging type is an access network paging or a core network paging.

9. The terminal device according to claim 6, wherein the identification information that is able to uniquely identify the terminal device in the core network is a system architecture evolution temporary mobile station identifier (S-TMSI) or an international mobile subscriber identity (IMSI) of the terminal device.

10. The terminal device according to claim 6, wherein the information of the terminal device is a physical layer identifier, and the processor is used for:
determining the paging type according to the physical layer identifier comprised in the first message.

11. The terminal device according to claim 10, wherein the processor is used for:
determining the paging type as core network paging when the physical layer identifier is a radio network temporary identifier (RNTI) for core network paging and the terminal device correctly receives the first message according to the physical layer identifier; or
determining the paging type as access network paging when the physical layer identifier is a RNTI for access network paging and the terminal device correctly receives the first message according to the physical layer identifier.

12. The terminal device according to claim 6, wherein the information of the terminal device is configured for the terminal device by the access network device or a core network device, or the information of the terminal device is configured according to a protocol.

13. The terminal device according to claim 6, wherein the processor is used for:
determining the paging type according to a resource used for receiving the first message.

14. The terminal device according to claim 13, wherein the processor is used for:
determining that the paging type is core network paging when the terminal device receives the first message on a specific resource for core network paging; or
determining that the paging type is access network paging when the terminal device receives the first message on a specific resource for access network paging.

15. The terminal device according to claim 14, wherein information of the specific resource for the core network paging or the access network paging comprises at least one piece of the following:
information of a time domain resource, information of a frequency domain resource, information of a space resource, and information of a code domain resource.

16. The terminal device according to claim 14, wherein the information of the specific resource for the core network paging or the access network paging is configured for the terminal device through the access network device or a core network device, or is configured according to a protocol.

* * * * *